United States Patent [19]
Peterson, II

[11] Patent Number: 5,862,195
[45] Date of Patent: Jan. 19, 1999

[54] CANISTER, TRANSPORT, STORAGE, MONITORING, AND RETRIEVAL SYSTEM

[76] Inventor: William Donald Peterson, II, 2219 Panorama Way, Holladay, Utah 84124

[21] Appl. No.: 708,791

[22] Filed: Sep. 9, 1996

[51] Int. Cl.$^6$ .................................................. G21C 19/00
[52] U.S. Cl. ........................ 376/272; 414/146; 414/347; 414/391
[58] Field of Search .................................. 376/272, 261; 414/146, 340, 347, 390–392, 399; 104/48

[56] References Cited

U.S. PATENT DOCUMENTS

| | | | |
|---|---|---|---|
| 3,940,577 | 2/1976 | Christofer | 376/272 |
| 4,065,006 | 12/1977 | Barry | 414/340 |
| 4,481,165 | 11/1984 | Anderson et al. | 376/272 |
| 5,448,604 | 9/1995 | Peterson, II | 376/272 |

*Primary Examiner*—Daniel D. Wasil

[57] ABSTRACT

A conveyance system provides for storing, monitoring, and retrieving (multi-purpose) canisters "MPC" for intermediate storage of spent fuel rods from nuclear power plants. The system includes a shielded transport system, an access corridor shielded for radiation, a lifting transport conveyance, an elevation chase, a dry-pool, seismic bracing to support the canisters in storage, associated shielding to confine radiation to the dry-pool, and air manifold system for cooling, and facilities to add alternative liquid radiation shielding around the canisters in the dry pool.

A RR-locomotive moves a RR-car having a radiation shielded transport container to communicate with a dry-pool access corridor. A bridge crane carries an "MPC" through the corridor to a vertical chase which accesses to the dry-pool. The bridge crane places the "MPC" at a cooling vent manifold. A seismic brace engages the "MPC" secure to the dry-pool wall. A configuration of radiation shielding confines emissions. An air manifold system enables convection air to cool the canisters. The system is operated from a remote control facility. Cask conditions are monitored, retrieved, collected, and reviewed an off-site date base. The dry-pool may be filled with water to provide additional radiation shielding.

14 Claims, 2 Drawing Sheets

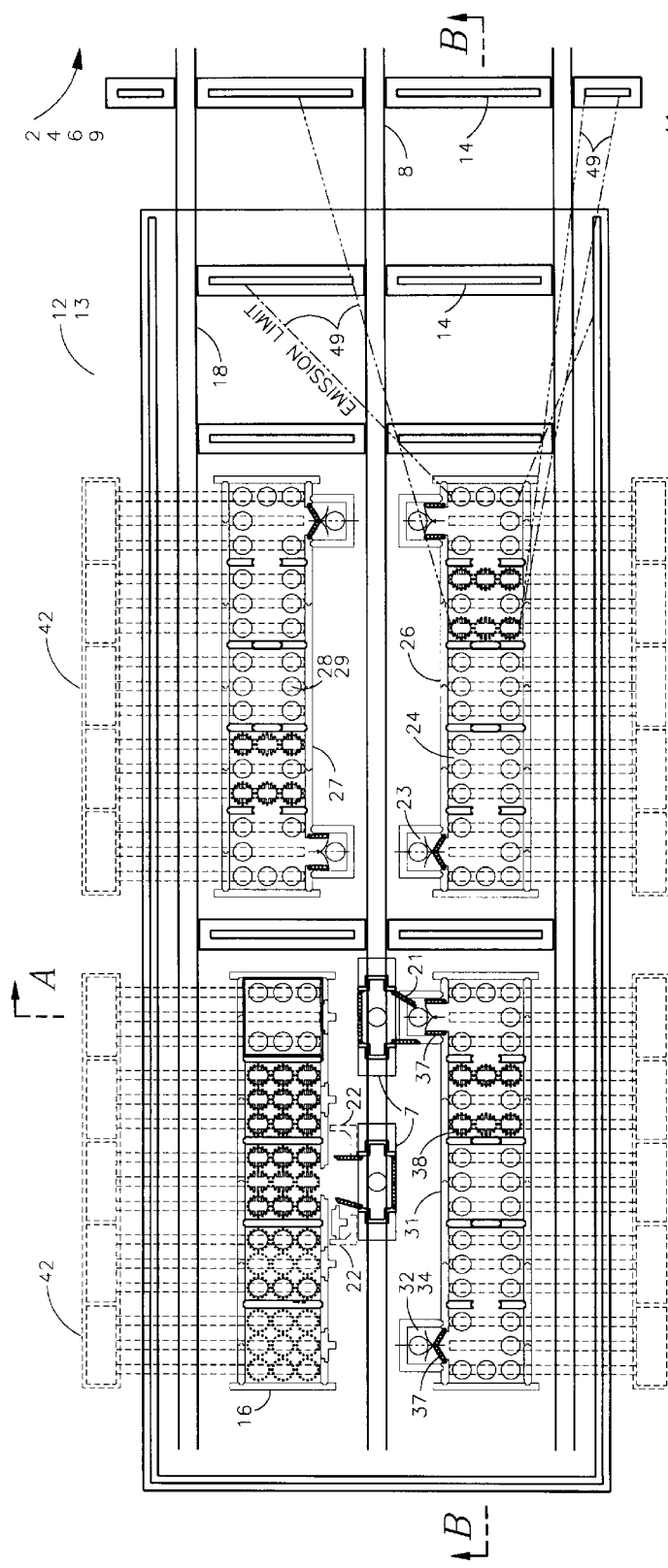
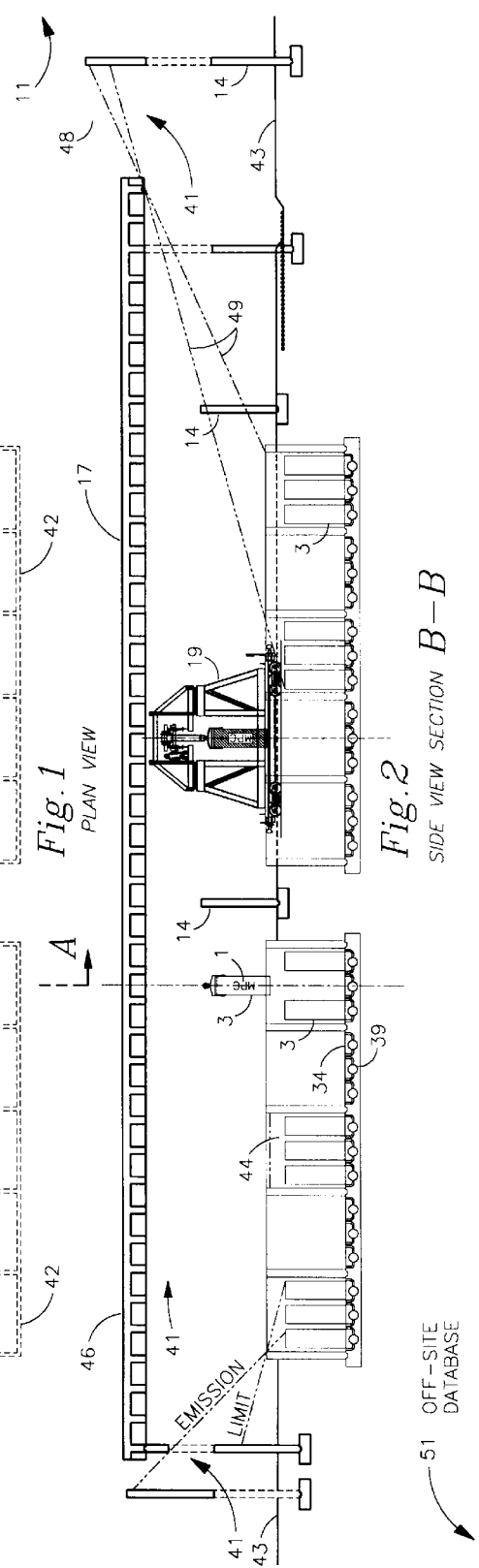
Fig. 1 PLAN VIEW
Fig. 2 SIDE VIEW SECTION B-B

VIEWED FROM LEFT END, SECTION AT A-A

FUEL RODS IN CANISTER
WATER DETECTION SECTION THRU MPC

CANISTER, TRANSPORT, STORAGE, MONITORING, AND RETRIEVAL SYSTEM

BACKGROUND OF THE INVENTION 108 nuclear power plants operate in the U.S. without any servicing off-site facility for storage of their spent nuclear fuel rods. When fuel rods can no longer efficiently produce steam, they are taken out of commission and are immediately put into under water storage at a power plant pool where the water absorbs the inherently generated heat. In time the fuel rods decay and the heat generation diminishes. After five years the fissile material is sufficiently spent (decayed/transformed) such that the fuel rods can be stored unconfined in an open air arena. A permanent spent fuel storage facility is planed in the Yucca Mountain region of Nevada. Until then, a "Monitored Retrievable Storage" (MRS) facility is being sought for the intermediate storage of the spent fuel. The author of this patent has worked on many varieties of nuclear material transport equipment and facilities for nuclear fuel since 1958. U.S. Pat. No. 5,448,604 describes an "MRS" facility serviced with railroad equipment.

STATEMENT OF THE ART

Spent fuel from power plant operation is put into water pools for dissipation of heat as it decays in storage. After about five years or more of radioactive decay, the spent fuel may be stored in the open air using ambient air convection cooling. Eight schemes for intermediate storage have culminated into the "MRS" concept where bundles of spent fuel rods are sealed in a thick steel walled cylinder called a multi-purpose-canister "MPC". In the traditional "MRS" scheme, the "MPC"s are encapsulated in two feet thick concrete and placed in open, outside storage. The concrete casks have provisions for convection air over the exterior surface of the "MPC"s for cooling.

The dry-pool invention is an intermediate scheme having a pool having an air manifold system for providing external surface air cooling when the traditional pool water is removed. The facility's roof, walls and access openings are configured to confine the radiation emitting from the "MPC"s being stored. This radiation would otherwise be being absorbed in the conventional pool water. The facility is un-manned and is operated remotely as is the inventors previous storage facility described in U.S. Pat. No. 5,448,604, Sep. 5, 1995. An elevation chase sets and controls the fall height of an "MPC" to a stopping media as it is lowered (placed) or removed from the dry-pool.

Before fuel rods are taken from a utility plant water-pond they grouped and put into an "MPC". The fuel rod laden "MPC" is transported from its water storage pool via an appropriate compilation of bridge crane and transporters. Transporters may included a railroad haul in a RR-car having radiation shielding and securement to prevent the "MPC" from tipping.

BRIEF SUMMARY OF THE INVENTION

Spent nuclear fuel is confined in welded sealed fuel rods. After fuel deterioration, these spent fuel rods are housed in welded, sealed closed multi-purpose canisters "MPC". An "MPC" is typically five (5') feet in diameter and stands 16 feet tall. The invention is an integrated transport, placement, and monitored storage and retrievable facility for the "MPC"s containing the nuclear spent fuel.

"MPC"s from a water storage pool are transported from the plant water pool to a dry-pool for storage. Throughout the transfer, the "MPC" is appropriately surrounded with radiation shielding to prevent inappropriate exposure both into and out of the system. Typically an "MPC" is taken from the water storage pool, placed in a shielded transport device (shielded RR-car). Shielded in the transporter, the "MPC" is moved from the plant pool location to the dry-pool location. With the transporter adjacent to the dry-pool, the "MPC" is lifted with a bridge crane and moved sideways out through doors, moved through a shielded corridor adjacent to the dry-pool, then the "MPC" enters the dry-pool, and is then moved in the dry-pool to a storage place on the floor of the dry-pool. When putting an "MPC" into the dry-pool, where there is a significant elevation change, an elevation chase follows the "MPC" such that it may never be subject to a free fall elevation drop of more than 18 inches. One form of the elevation chase of this invention is a column of water where the column of water is lowered below the "MPC" as the "MPC" is lowered to the dry-pool floor. When the MPC approaches the dry-pond floor, the water is then out of the elevation chase and water lock gates are opened to allow the bridge crane to move the lowered to the floor "MPC" to move it about the dry-pool floor to a selected storage location. Each storage location has an in-floor inlet air manifold from an outside air source so that a natural convection of cooling air moves up the sides of the fuel heated "MPC". The natural temperature rise of "MPC" surface heated air continuously pulls in outside air which cools the "MPC". The cooling air rises above the dry-pool and exits out from under the dry-pool building roof, flowing out an end of the building. Under the roof, two ends of the dry-pool are open to the atmosphere to encourage a flow of air across and above the dry-pool. The inlet air manifold is constructed such that should the dry-pool be filled with water, the air manifold also fills with water but water does not leak out of the manifold.

The casks are stored secure from tipping with a seismic brace which swings out from a wall and secures the top of the cask to wall to prevent it from tipping in a seismic occurrence. The casks are stored in a designed matrix. The matrix has specific individual storage location addresses for the placement of each casks according to an X-Y Cartesian measured location. The exact address location for each cask is recorded at a control center data base when the cask is placed. Each cask is systematically and routinely monitored for its condition in storage and the tested results are automatically transmitted to and recorded in an off site data base. The data is automatically reviewed and analyzed for a problem condition. When a problem situation is determined, appropriate personnel are automatically notified so that corrections may be implemented.

BRIEF DESCRIPTION OF DRAWINGS

FIG. 1 of the drawing is a plan view of the dry-pool facility.

FIG. 2 is a side elevation section view.

Figure 3:
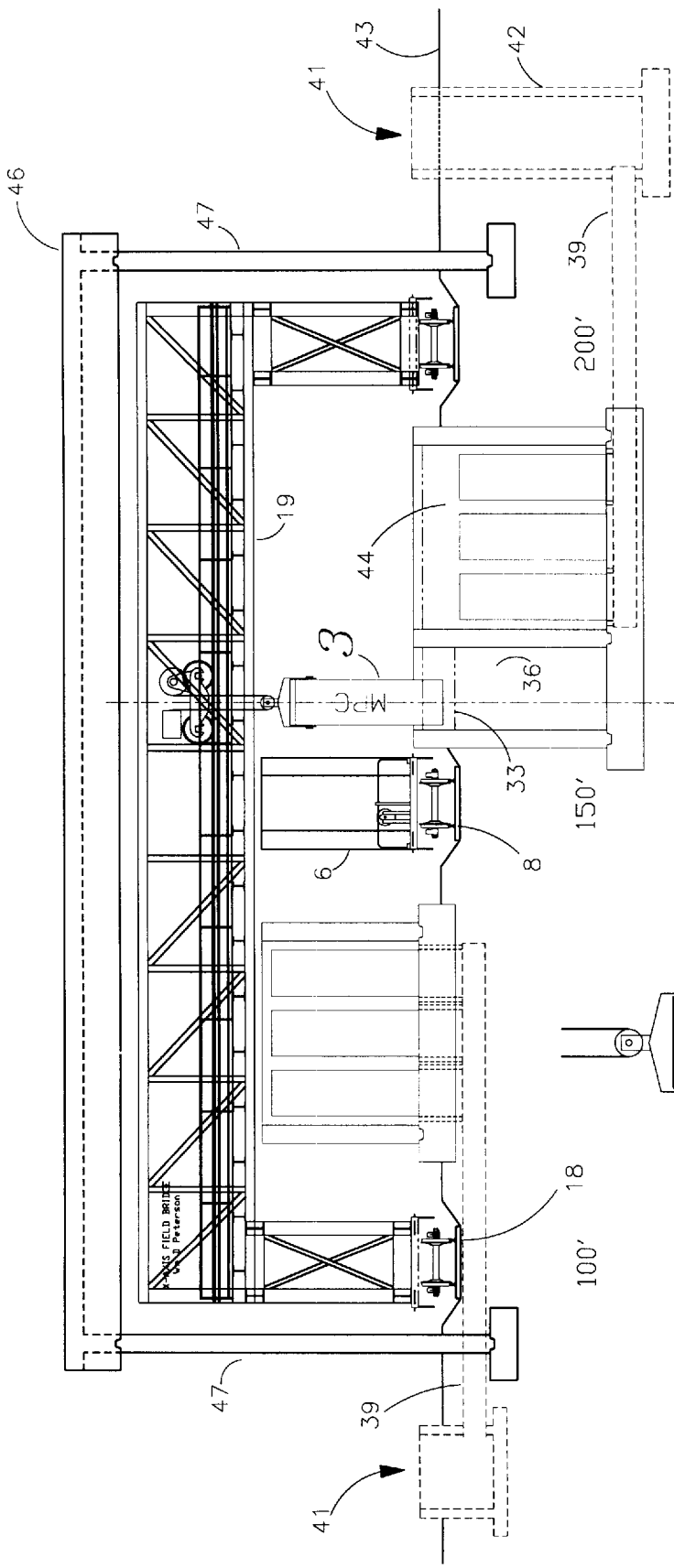
FIG. 3 is an end section view.
Figure 4:
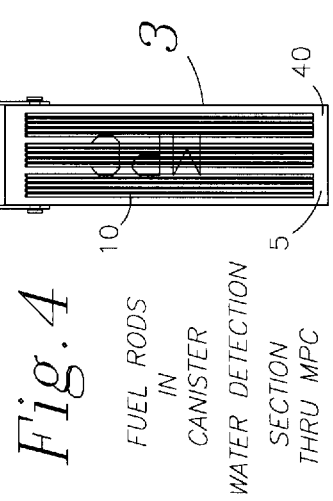
FIG. 4 shows fuel rods in a multi-purpose-cannister.

Phantom lines show that the exodus of radiation from the system is prevented by radiation barriers between the ponds and the side walls and roof of the building. The system of barriers are configured such that a canister carrying transport car and off/on loading bridge crane may freely enter and leave the building while radiation is still confined behind the fixed barriers.

Along each side of the building are outside air entry basins from which cooling air is piped to underneath each canister in storage. In normal operation, the dry-pools have no water and no one ever enters the dry-pool building. But for alternative shielding, each dry-pool section and its air manifold system is configured such that it may be filled with water to a sufficient level over the "MPC" canisters so that anyone entering the building would be shielded by water from fuel rod radiation. The work being done within the building is all viewed and controlled from an off-site control center.

DETAILED DESCRIPTION OF THE INVENTION

After service in power plant nuclear reactor spent fuel rods 1 which can no longer heat to efficiently make steam are put into the power plants water storage pool 2 for about five years or more of further radioactive decay or heat reduction. After time, clusters of the typically fourteen foot long spent fuel rods 1 are put into cylindrical canisters 3, "MPC"s 3, for transport and dry storage. Fuel rods 1 are typically loaded into "MPC"s 3 under the pool water 2 where the canister 3 loading has the shielding of the water 2 during this operation. "MPC" 3 is a term or name for a popular design called a multi-purpose-canister 3 where the "MPC" 3 is used for both the transport of the fuel rods 1 and storage of the fuel rods 1. A proposed "MPC" 3 has shielding on its top to shield operators making its closure. "MPC"s 3 are usually standing vertical, an exception is when they lay horizontal during transport. For interplant transfer from the wet to the dry storage the inventors preferred design is to keep the "MPC" 3 vertical.

Loaded and sealed "MPC"s 3 are crane 4 lifted from the plant's water storage pool 2, carried through a shielded corridor 6, placed into a transporter 7 which rides on a RR-track 8 or roadway. The transporter 7 has walls and floor with radiation shielding 9 to confine radiation when the transporter 7 is outside in the open 11 between the wet pool 2 storage and dry-pool 12 storage. The "MPC" 3 containing transporter 7 enters the storage field area 13 which has radiation shielding 14 by either strategically placed panels 14, or storage casks 16 themselves, or the building 17 over the dry-pool which may be the primary shield for the entire storage site 13. The transporter 7 enters on tracks 8 extending from the load out at the plant water pool 2. At the field 13 or in the building 17 other tracks 18 carry a bridge crane 19 which picks an "MPC" 3 from the transporter 7. Doors 21 in the transporter 7 shielding 9 allows a horizontal exodus of the "MPC" through a shielded corridor 22 to an entrance 23 of the dry-pool 24. Walls 26 of an on plane dry-pool 27 provide shielding to move the "MPC" to the its storage spot 28. Once in position a seismic brace 29 hinged to the wall 26 secures the "MPC" 3 standing vertical.

In a submerged dry-pool 31 a vertical chase 32 provides a falling floor 33 so as the "MPC" 3 is lowered to the dry-pool 31 floor 34 should the "MPC" 3 be dropped, it would fall less than eighteen inches to an impact. The falling floor 33 is a mechanically moving device which would move with the "MPC" 3. A most simple form of a hydraulic device is simply a pool of water 36 confined by water lock gates 37. The lock water 36 surface would provide a cushioned fall and only an obvious and massive leak would foil the safety process. When the "MPC" 3 gets to the dry-pool 31 floor 34 the water lock gates 37 are opened and the bridge crane 19 then carries the "MPC" 3 to its selected storage spot 28. As described before, again, a hinged seismic brace 29 secures the top of the "MPC" 3 to the dry-pool 31 walls 26.

At the storage spot 28 around the perimeter of the standing "MPC" 3 vertical holes 38 communicated with a horizontal pipe 39 which brings in outside air 41 for cooling the surface of the standing "MPC" 3. In the on plane dry-pool 27 configuration the horizontal pipe 39 may extend directly out to the outside air atmosphere 41 without a basin 42. In the submerged dry-pool configuration 31 an outside basin 42 extends down from the ground surface 43 where the sub-floor 34 horizontal pipe 39 extends horizontally to into the outside air entrance basin 42 so outside air 41 can sink into the basin 42, then proceed under the dry-pool 31 floor 34, then proceed up the circumferential holes 38 to cool surface of the "MPC" 3. The cooling air 41 would then be vented back to the atmosphere 41 by exiting to the outside of the building 17.

In the submerged dry-pool configuration 31, if additional shielding should be desired, then the dry-pool 31 could be filled with water 44 which would then provide shielding typical of the wet pool 2 configuration. Then, again, by draining the water 44 out the dry-pool 31 it would return to its dry configuration. After such an exercise, it would be well to check the "MPC"s 3 for water leakage from the pool into the vessels.

A building 17 having a thick concrete roof 46 and thick concrete walls 47 combined with vertical shielding 14 will shield the ambient atmosphere 48 from outward radiation 49 but still allow a transporter 7 and the servicing bridge crane 19 to freely enter and exit the storage field 13 or storage building 17. The field 13 and storage building 17 are un-manned and the storage operation is orchestrated from an off-site control center 51.

What is claimed is:

1. A transport, storage, monitoring, and retrieval system for spent nuclear fuel storage canisters, comprising three or more rows of trackage, dry pools between rows of trackage for canister storage, a canister transporter, transporter tracks for carrying the transporter adjacent to or between pools, bridge crane carrying tracks, the transporter tracks being between a set of bridge crane carrying tracks, and the dry-pools being between the bridge crane carrying tracks.

2. The system of claim 1 and further having the dry-pools being equipped with an integral cooling air ventilation manifold system bringing in outside air into the dry-pools under the stored canisters.

3. The system of claim 2 having the dry-pools being constructed water tight such that the pools can be filled with water for shielding and cooling.

4. The system of claim 1 and further having an access corridor shielded for radiation, a lifting transport conveyance with an associated elevation chase to transfer a canister between a shielded transport system and storage locations at the floor of the dry-pool, the elevation chase limiting a potential dropping of the canister should it release from the lifting transport.

5. The system of claim 4 and further having strategically placed vertical radiation shielding preventing radiation from exiting the storage area.

6. The system of claim 5 and further having a radiation shield roof.

7. The system of claim 1 having the bridge crane tracks being capable of carrying a transporter.

8. The system of claim 7 having one or more bridge cranes, each spanning over one or more rows of trackage.

9. The system of claim 1 having a system of RR-transfer tables such that a bridge crane may be moved so it can engage more than one set of off loading tracks enabling more than one track capable for off-loading canisters to more than one dry-pool.

10. The system of claim 1 having seismic bracing for supporting vertically standing canister casks.

11. The system of claim 1 where the system is operationally controlled from an off-site control station.

12. The system of claim 1 where the dry-pools are themselves casks for the storage to one or more canisters.

13. The system of claim 8 having the transporter comprise canister carrying transport cars which can be off-loaded or loaded under a bridge crane.

14. The system of claim 1 wherein each of said dry-pools include a dry radiation shielding material.

* * * * *